June 7, 1932. W. OWEN 1,861,665
ROLLER RUNWAY FOR SHEET GLASS
Filed Sept. 12, 1930 3 Sheets-Sheet 1

June 7, 1932. W. OWEN 1,861,665
ROLLER RUNWAY FOR SHEET GLASS
Filed Sept. 12, 1930 3 Sheets-Sheet 2

INVENTOR
Wm Owen
by
James C. Bradley
Atty

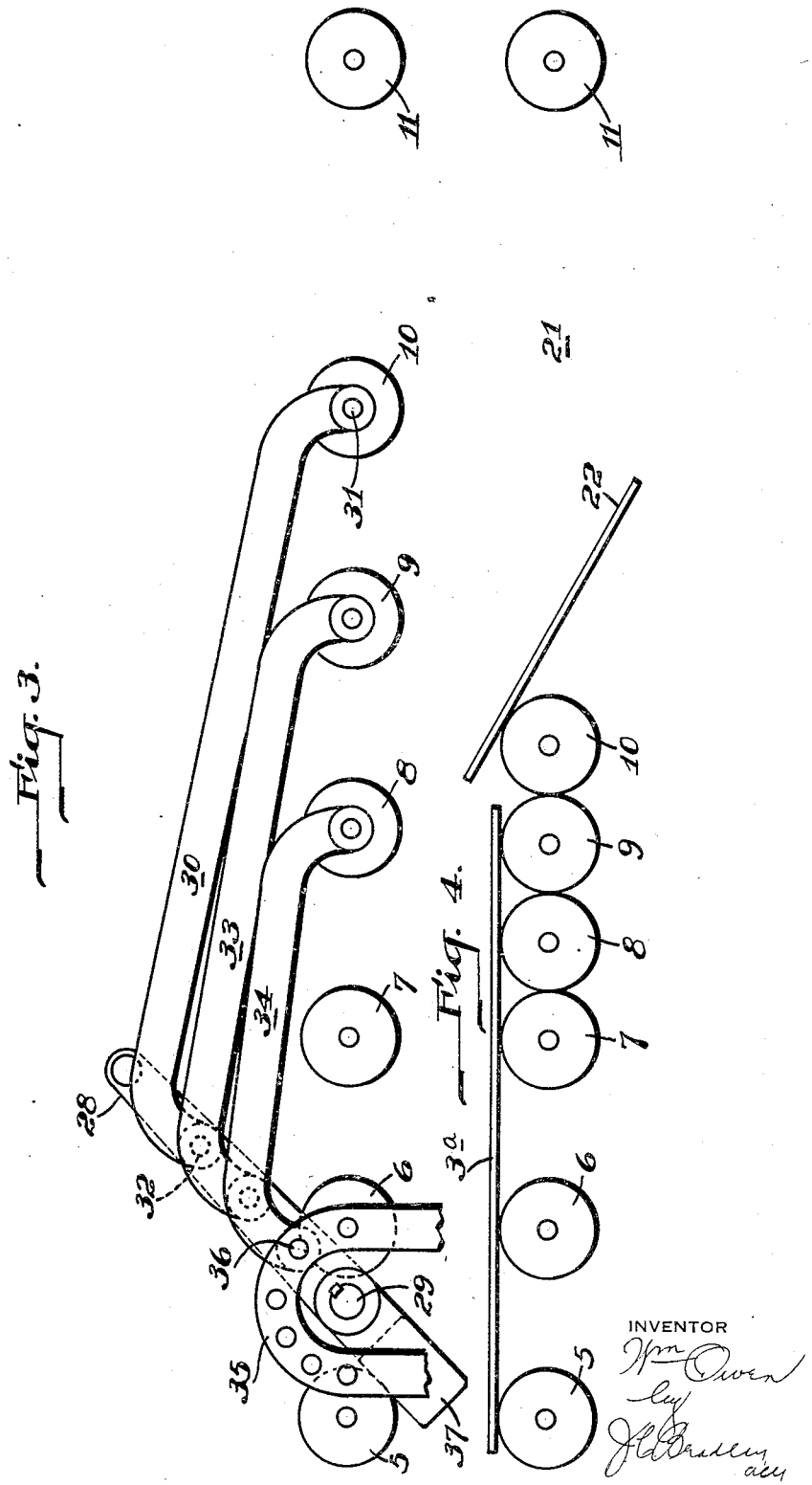

Patented June 7, 1932

1,861,665

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

ROLLER RUNWAY FOR SHEET GLASS

Application filed September 12, 1930. Serial No. 481,430.

Figure 1:
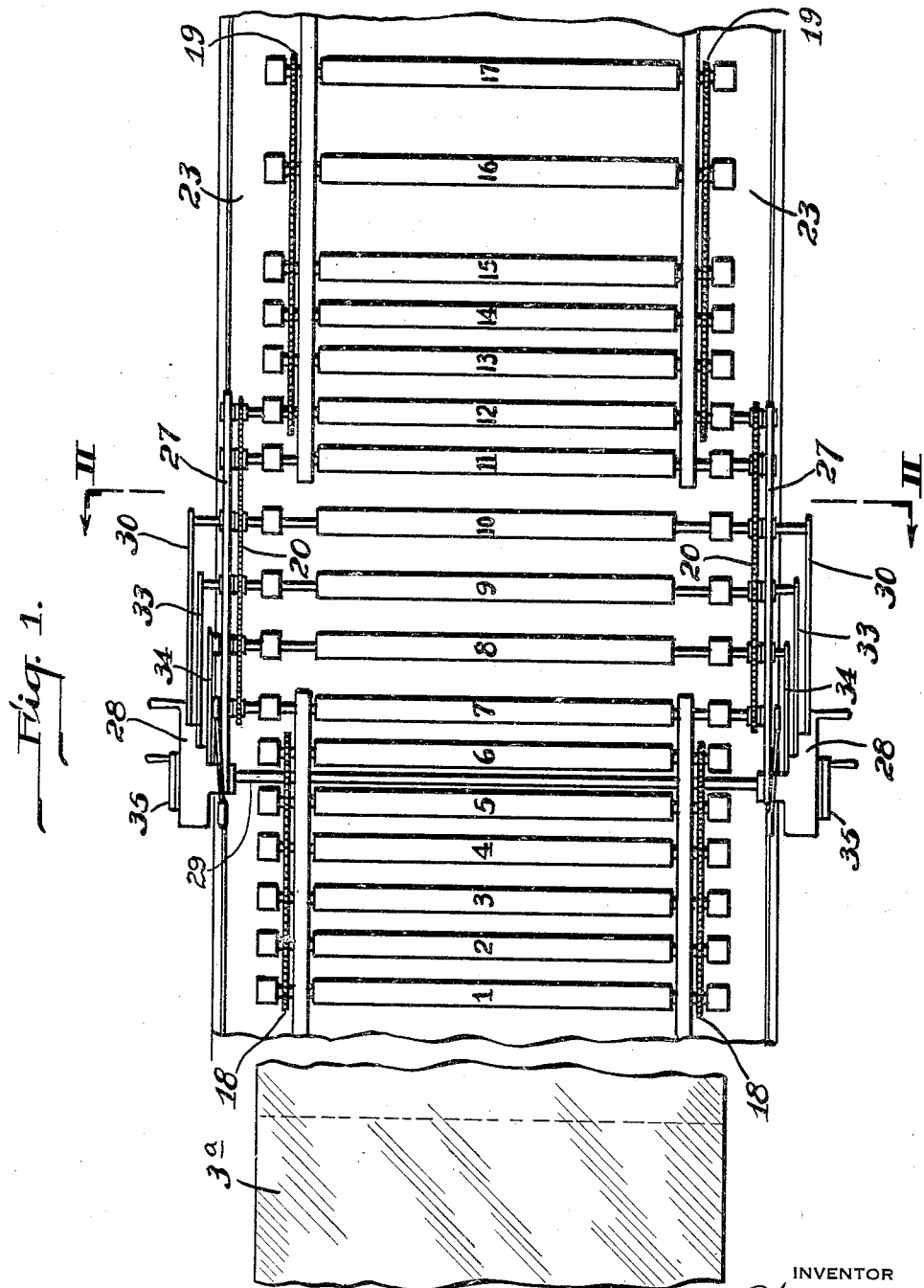
Figure 2:
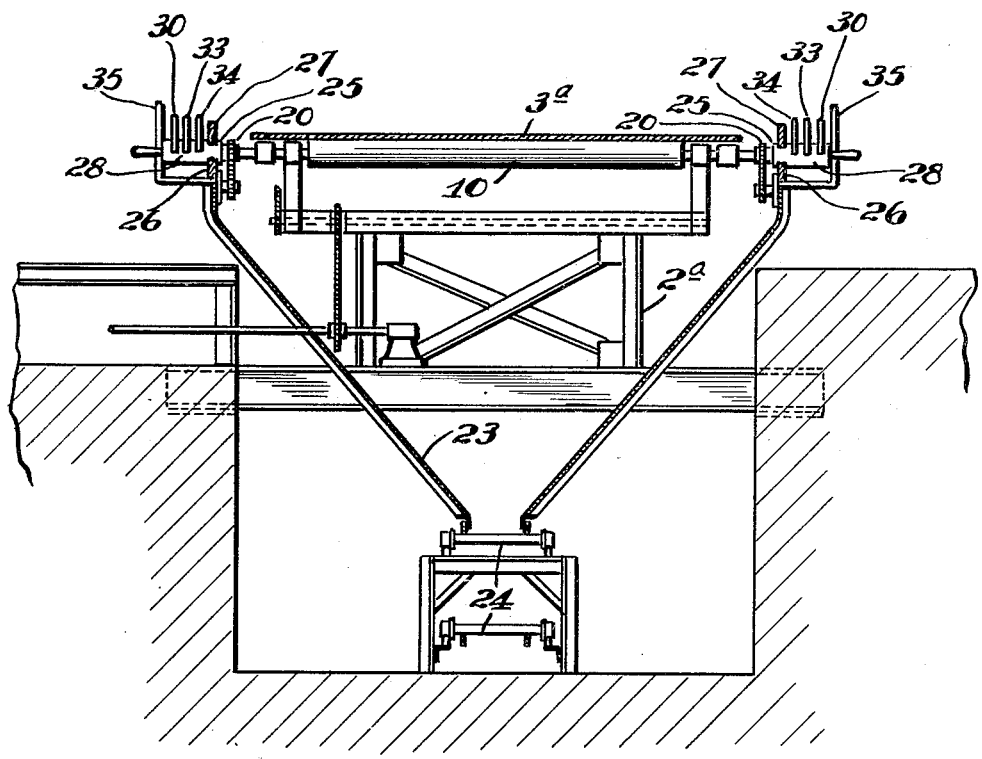

The invention relates to a roller runway for sheet glass. The invention is designed for use at the outlet end of a roller leer, but is not limited to use in this particular relation. The object of the invention is to provide a convenient means for getting rid of waste pieces of glass, such as the rounded ends of the sheets (where the process is an intermittent one) or other pieces which because of their imperfections or because they are too small or irregular in shape for use, it is desired to get rid of, instead of carrying them further along on the runway. To this end means are provided for making a gap or opening in the runway through which the glass may drop into a cullet hopper. One embodiment of the invention is illustrated in the accompanying drawings, wherein:

Figure 1 is a plan view of the runway at the outlet end of a glass leer provided with the improvement which is the subject matter of the present invention. Fig. 2 is a section on the line II—II of Fig. 1. Fig. 3 is a diagrammatic side elevation of a part of the construction with the parts in one position. And Fig. 4 is a diagrammatic side elevation showing the parts in a position different from that of Fig. 3.

Referring to the drawings, 1 to 17 are a series of rolls mounted in a suitable framework 2ᵃ at the outlet end of a roller leer (not shown), and 3ᵃ is the end of an oncoming sheet of glass which is passing over the runway. The rolls 1 to 6 are provided at their ends with sprockets over which passes an endless driven chain 18 for rotating the rolls so as to move the glass forward, this being the usual method of driving rolls of this character. The rolls 12, 13, 14, 15, 16 and 17 are driven by a chain 19 passing around sprockets on the ends of the rolls. The rollers 7, 8, 9, 10 and 11 are driven by endless chains 20 passing around sprockets on the ends of the roll 12. In this manner the rolls 7, 8, 9, 10, and 11 are all driven from the roll 12.

The rolls 8, 9, and 10 are mounted for movement longitudinally of the runway intermediate the fixed rolls 7 and 11 and may occupy either the position shown in Figs. 1 and 3, or the position shown in Fig. 4, at which time they have been moved to the left closely adjacent the roll 7 so as to provide the space 21 between the roll 10 and the roll 11, so that any glass which it is desired to dispose of can fall down through the runway and be gotten out of the way. In Fig. 4, the rounded end piece or nose 22 which has been cut from the sheet is shown as sliding down through the space 21. Beneath this space 21 a hopper having the inclined side walls 23 is provided, as indicated in Fig. 2. This hopper discharges to an endless conveyor 24 which carries the broken or waste glass away to a suitable point of disposal. The sliding rolls 8, 9, and 10 are each provided at its ends with grooved rollers 25 which are engaged by the guide plates 26 and 27, the upper guide plate 27 being removable. A pair of levers 28, 28 are provided at the sides of the runway, such levers being mounted upon a transverse shaft 29. The roll 10 is connected to these levers by means of the connecting rods 30, said rods engaging the axle 31 of the roll at one end and at the other end being secured to the pivots 32. The next roll 9 is similarly secured to the levers by means of the connecting rods 33, while the roll 8 is secured to the levers by means of the connecting rods 34. An indexing quadrant 35 is secured to the side of the frame along one side of the line of movement of one of the levers 28 and a pin 36 serves to lock the lever to this quadrant so that the lever and the rolls 8, 9, and 10 controlled thereby can be securely locked in either the normal position shown in Fig. 3, or in the position shown in Fig. 4, at which time the rolls are brought closely adjacent to each other and to the roll 7 in order to provide the relatively wide discharge space 21. As heretofore indicated, the movable rolls 7, 8 and 9 are driven regardless of their position by means of the endless chains 20 which are driven from the roll 12 and pass over the sprockets on the ends of such rolls 8, 9, and 10. In this manner, a discharge space through the runway of any desired width may be provided as the number of rolls which can be moved in order to provide the space may be increased to suit requirements. In order to facilitate the swinging of the levers 28, counterweights 37 may be employed upon the lower ends of such levers, as indicated in Fig. 3.

What I claim is:

1. In combination in a roller runway, a pair of rolls in the runway spaced apart a substantial distance and fixed against movement longitudinally thereof, a series of rolls lying between the fixed rolls with the end members thereof spaced away from the fixed rolls and all mounted so that they may be moved toward one of said fixed rolls and brought into close proximity to each other, a pair of operating levers at the sides of the runway, having the same axis of rotation and a series of pairs of connecting rods between the ends of the rolls and the levers, said pairs of connecting rods being connected to the levers at different distances from the axis of rotation thereof so that when the levers are moved, the rolls are moved different distances.

2. In combination in a roller runway, a plurality of spaced rolls fixed against longitudinal movement, a plurality of adjustable rolls disposed therebetween and means for adjusting the rolls to provide a greater space at one side thereof than the other.

3. In combination in a roller runway, a plurality of spaced rolls fixed against longitudinal movement, a plurality of longitudinally adjustable rolls disposed therebetween and means for adjusting the rolls to provide a greater space at one side thereof than the other.

4. In combination in a roller runway, a plurality of spaced rolls fixed against longitudinal movement, a plurality of longitudinally adjustable rolls disposed therebetween and means for simultaneously adjusting the rolls to provide a greater space at one side thereof than the other.

In testimony whereof I have hereunto subscribed my name this 8th day of September, 1930.

WILLIAM OWEN.